A. ANDERSON.
HARROW.
APPLICATION FILED JUNE 16, 1914.
1,121,320.
Patented Dec. 15, 1914.
2 SHEETS—SHEET 2.
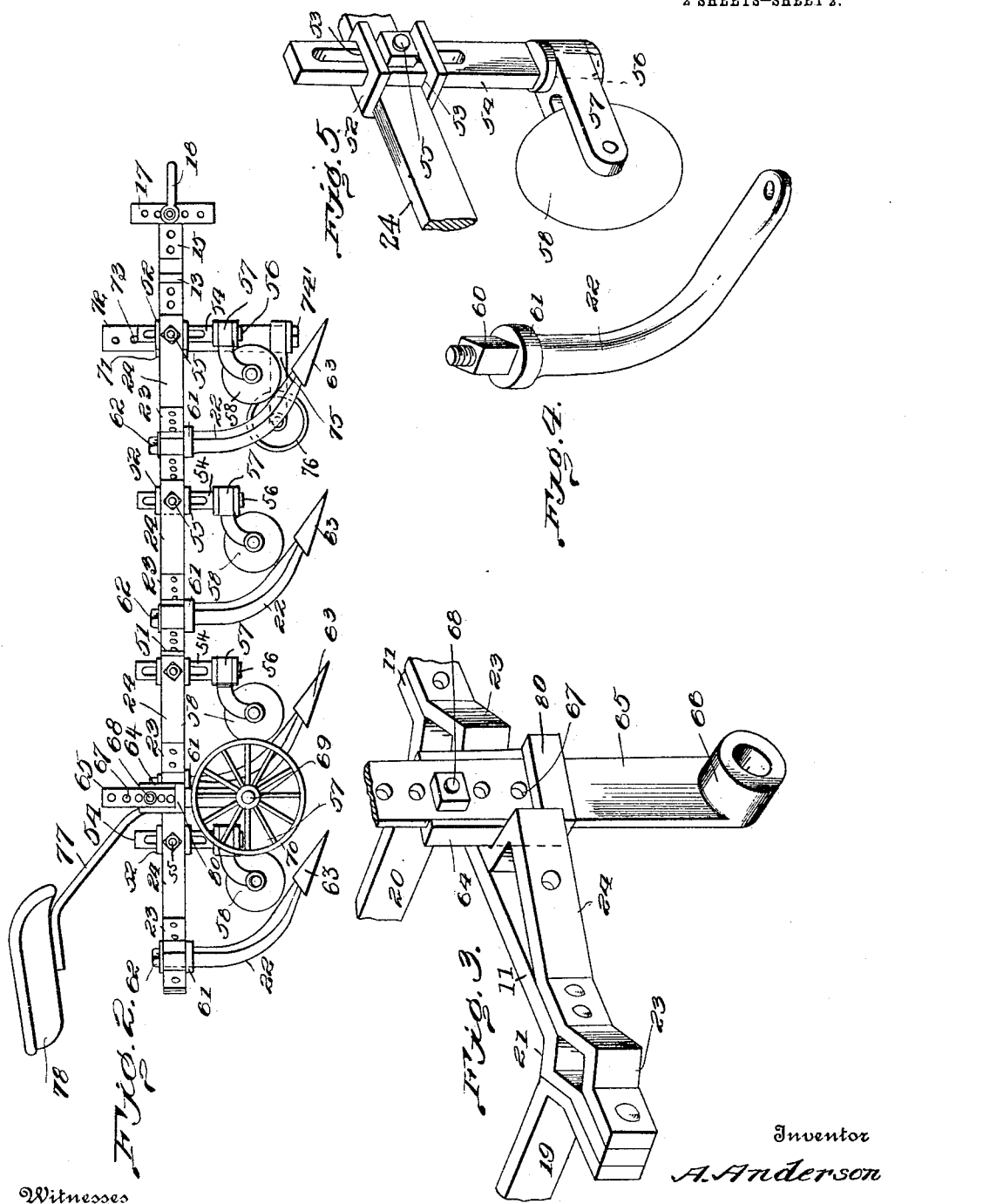
Witnesses
C. N. Woodward
Jno Imire
Inventor
A. Anderson
By
Attorneys.

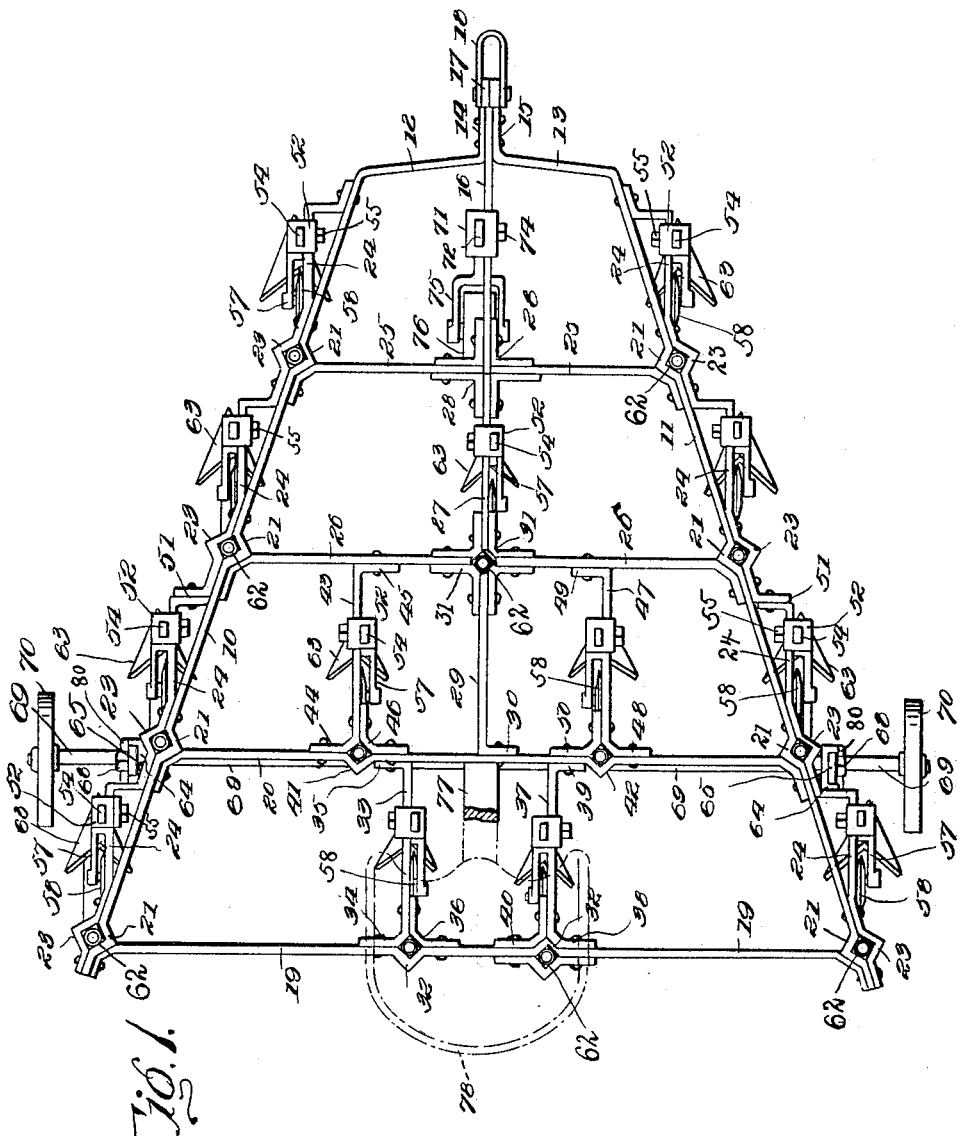

UNITED STATES PATENT OFFICE.

ALFRED ANDERSON, OF CHICAGO, ILLINOIS.

HARROW.

1,121,320.   Specification of Letters Patent.   Patented Dec. 15, 1914.

Application filed June 16, 1914. Serial No. 845,445.

*To all whom it may concern:*

Be it known that I, ALFRED ANDERSON, citizen of the United States, residing at Chicago, in the county of Cook and State of Illinois, have invented certain new and useful Improvements in Harrows, of which the following is a specification.

This invention relates to harrows, and has for one of its objects to provide an efficient harrow structure formed entirely of metal and in which the parts mutually support and brace each other.

Another object of the invention is to provide a simply constructed device in which a cutting colter is provided in advance of each of the teeth of the cultivator to sever cornstalks and the like.

Another object of the invention is to provide a device of this character in which the standards of the hoes or cultivator teeth operate also as colters to divide weeds and like growth and prevent them from clogging the standards.

Another object of the invention is to provide a device of this character having means for adjusting the depth of cut.

Another object of the invention is to provide a device formed with a plurality of parts connected by bolts so that an impaired or broken part may be quickly replaced without discarding the remainder of the device.

With these and other objects in view the invention consists in certain novel features of construction as hereinafter shown and described and then specifically pointed out in the claims; and in the drawings illustrative of the preferred embodiment of the invention—Figure 1 is a plan view of the improved device. Fig. 2 is a side elevation of the parts shown in Fig. 1. Fig. 3 is an enlarged perspective detail of a portion of the frame of the device. Fig. 4 is an enlarged perspective view of one of the hoe or cultivator tooth standards. Fig. 5 is an enlarged perspective view of one of the colter standards.

Corresponding and like parts are referred to in the following description and indicated in all the views of the drawings by the same reference characters.

The improved harrow is constructed entirely of metal as light as possible consistent with the strains to which it will be subjected, and is preferably formed somewhat in A-shape and includes main side members or bars 10—11, the side bars being bent toward each other at the forward or narrower end as represented at 12—13, and thence bent into parallel relations as represented at 14—15, and united to a central member 16, the latter being extended in advance of the terminals 14—15 and supplied with a clevis device 17 to which a U-shaped clip 18 is connected to receive the draft appliances. The member 17 is preferably formed of a single piece bent intermediate its ends upon itself and bearing at opposite sides of the forward end of a central member 16 and provided with a plurality of transverse apertures to receive the draft clip 18, so that the draft appliances may be connected to the clevis device at different points of elevation. By this means the point at which the draft is applied may be controlled to any required extent within the range of the apertures in the clevis.

At their rear ends the side bars 10—11 are united by a transverse bar 19 and likewise connected by a transverse bar 20 spaced forwardly of the bar 19. At uniform spaced intervals the bars 10—11 are bent into half sockets 21 to receive the upper ends of the tooth standards, the latter being represented conventionally at 22. Fitting over each of the half sockets 21 are cap devices 23 which are formed to engage over the standards 22 at their upper ends and externally of the sockets 21. The standards 22 are preferably formed of square or diamond shaped metal and the sockets 21 and the socket portions of the caps 23 conformed to the outlines of the standards so that the latter are firmly held in position and prevented from turning. Each tooth standard is precisely alike, and any required number may be employed as hereafter explained.

The bars 10—11 may be provided with any required number of the tooth standard receiving sockets, and it is not desired therefore to limit the improved device in this respect, but for the purpose of illustration each of the side members is provided with four of the sockets to support a corresponding number of the tooth standards. The caps 23 are coupled together as represented at 24, these portions of the couplings being extended in parallel relation to the line of draft of the harrow. One of the portions 24 is thus extended in advance of each of the outer tooth standards and is designed to support a small rolling colter, one of the colters thus operating in advance of each of the cultivator standards, the object to be hereafter explained.

Directed inwardly from the side bars 10—11 opposite the forward tooth bar socket and the socket next in the rear are bars 25—26. The inwardly directed members 25 bear at their inner ends against the rear end of the central member 16, while another central member 27 is disposed in longitudinal alinement to the central member 16, the members 16—25—27 being coupled by brackets 28 which are riveted to the last-mentioned members as represented in Fig. 1.

Another central member 29 extends forwardly of the bar 20 and is formed with a terminal offset 30 bolted or otherwise secured to the bar 20 and terminates slightly at the rear of the rear end of the central member 27. The bars 26—27—29 are coupled at their confronting ends by L shaped brackets 31, the elbow portions of the brackets uniting to form a socket to receive the squared upper portion of one of the cultivator standards as shown in Fig. 1. The rear bar 19 is formed with half sockets 32, one of the sockets 32 extending outwardly or to the rear, while the other socket 32 is preferably extended inwardly or forwardly. A longitudinally directed bar 33 is connected to the rear bar 19 by an offset 34 at its rear end and is connected to the intermediate bar 20 by an offset 35. An L-shaped bracket 36 unites the bars 19—33, the elbow portion of the bracket 36 coacting with the offset 34 to complete the half socket to receive one of the tooth bar standards.

Another bar 37 extends between the bars 19—20 and is offset at its ends as represented at 38—39 and united thereby to the rear bars 19—20. An L-shaped bracket member 40 unites the bars 19—37, the elbow portion of the bracket 40 coacting with the offset 38 to form a socket to receive one of the tooth standards.

The bar 20 is provided with half sockets 41—42 which are located nearer the bars 10—11 than the sockets 32 of the rear bar 19. Extending between the intermediate bars 20—26 at one side of the central member 29 is another bar 43 having lateral offsets 44—45 at its ends and united thereby to the bars 20—26. An L-shaped bracket 46 unites the bars 20—43 and coacts with the half socket 41 and the offset 44 to form a socket to receive one of the cultivator standards.

Extending between the intermediate bars 20—26 at the opposite side of the central bar 29 is another bar 47 having lateral offsets 48—49 at its ends and united thereby to the bars 20—26. An L-shaped bracket 50 unites the bars 20—47 and coacts with the half socket 42 and the offset 48 to form a socket to receive one of the cultivator standards. The intermediate tooth standards which are supported by the rear bar 19 are spaced apart a comparatively short distance at each side of the center of the harrow structure, while the tooth standards which are carried by the intermediate bar 20 are spaced a greater distance apart at each side of the center, the various tooth bars thus forming furrows at substantially uniform distances apart, and none of the tooth bars trailing one behind the other, but each forming its own independent furrow, as will be obvious.

Each of the tooth standards of the side bars 10—11 is thus provided with one of the forwardly directed portions 24 of the frame, while each of the intermediate tooth bars is provided with a forwardly directed bar, as represented at 27—33—37—43—47, the several bars last mentioned extending in parallel relation to each other and parallel to the line of draft of the harrow.

The various portions 24 of each of the side bars including their half sockets may be formed of a single piece bent to the required shape, but each set of the portions 24 including their sockets will preferably be formed each in two portions united at 51 to simplify the manufacture, and to enable broken or impaired parts to be more readily removed.

Each of the portions 24 and the forwardly directed bars 27—33—37—43—47 are designed to support the standards of small colter devices, preferably of the roller form, and each operating in advance of one of the cultivator standards, to sever weeds, cornstalks, and like material when the improved device is employed upon fields containing such obstructions, but the last mentioned colter devices will not be required when the cultivator is employed in fields which do not contain such or similar obstructions. The various colter supports are precisely alike, and the description of one will suffice for all. Each colter support comprises a U-shaped member 52 bearing against the inner face of one of the supporting bars and provided with vertically alining slots 53 to receive a slotted standard 54, the slot designed to receive a clamp bolt 55 which extends through the body of the member 52 and likewise through the supporting bar, the member 54 being thus adjustable vertically relative to the member 52 and its support to any required extent within the range of its slot, as will be obvious. At its lower end the standard 54 is provided with a journal 56 to receive the bearing of a yoke 57 in which a rolling colter blade 58 is mounted, the yoke extending rearwardly of the standard 54 as shown. Each of the cultivator standards 22 is formed with a square or other than round shaped upper end 60 to enter the sockets of the various bars and be prevented from rotating therein. Each cultivator standard 22 is provided with a stop collar 61 which bears beneath the socket, and each cultivator bar is provided at its upper end with a clamp nut 62 bearing upon the upper end of the socket. By this means each cultivator bar 22 is firmly held in position and curved forwardly and terminates in a hoe or cultivator blade 63. The body portions of each of the standards 22 is square or diamond shape, and presents one of its edges forwardly, and thus serves as a colter or divider to separate the weeds or other obstructions which may pass upwardly over the cultivator blades.

Fitting against the outer faces of an opposite pair of the colter supporting portions 24 is a channel-shaped member 64, each having a guide loop at the lower end and adapted to receive a standard 65, the latter having a bearing 66 at its lower end and provided with a plurality of transverse apertures 67, the apertures designed to receive a clamp bolt 68 by which each of the standards is connected to one of the members 64, and adjustable vertically within the range of the apertures 67. The members 64 are located at opposite points at the rear portion of the frame, preferably near the transverse bar 20, and are firmly supported by the coaction of the channels and loops of the member 64. A transverse shaft 69 is mounted for rotation through the bearings 66 and carries ground wheels 70 at its ends, the ground wheels being preferably located externally of the line of draft of the harrow. Engaging around the central member 16 is a clip device 71 similar to the clip device 52 and slotted to receive a standard 72 having a plurality of apertures 73 to receive a clamp bolt 74 whereby the standard is coupled to the clip member 71 and likewise through the central longitudinal member 16. At its lower end the standard 72 is provided with a journal 74' to receive a yoke 75 which carries a ground wheel 76, being thus free to rotate and serves as a forward caster wheel to the cultivator. The ground wheels 70 and the caster wheel 76 are thus adjustable vertically to control the depth of cut of the cultivator hoes, while the various rolling colter devices are likewise adjustable to operate at the position best to accomplish the desired results.

The improved device is simple in construction and compact, and may be employed wherever a cultivator device is required, and may be readily adapted for use in cultivating corn ground, or ground containing other obstructions, or for use in ground which contains none of the obstructions noted, in the latter event, as before stated, the rolling colters 58 not being required.

The cultivator frame may be formed of any required size and arranged to contain any required number of the cultivator standards and hoes.

The framework of the device may be provided with a standard 77 to carry a driver's seat, indicated at 78.

Having thus described the invention, what is claimed as new is:

1. An implement of the class described including a supporting frame, a plurality of tooth standards carried by said frame and spaced apart, a plurality of bars carried by said frame and extending respectively in advance of each of said tooth standards, and a colter device carried by each of said bars.

2. In an implement of the class described, a supporting frame including side members converging toward the forward end and having half sockets spaced apart, cap devices having opposing half sockets and connected to said members and coacting with the half sockets thereof to support tooth standards, said caps being connected by bars extending in parallel relation to the line of draft of the implement, and a colter device carried by each of said bars in advance respectively of the tooth standards.

3. In an implement of the class described, a supporting frame including side members converging toward the forward end and transverse members connecting the side members at spaced intervals, said members each having half sockets spaced apart, cap devices having opposing half sockets and connected to said members and coacting with the half sockets thereof to support tooth standards, the caps of the sockets of said side bars being connected by bars extending in parallel relation to the line of draft of the implement, bars connected to said transverse frame members and extending respectively in advance of the sockets thereof, and a colter device carried by each of said bars in advance respectively of the tooth standards.

4. In an implement of the class described, a supporting frame including a plurality of bars extending in parallel relation to the line of draft of the implement, a plurality of tooth standards connected to said frame and in alinement respectively with said bars, a U-shaped clip engaging each of said bars and having vertically alined slots, a colter standard movable through the slots of each of said clips, a colter carried by each of said colter standards, and a clamp device operating to adjustably support each of said clips to its standard.

In testimony whereof I affix my signature in presence of two witnesses.

ALFRED ANDERSON. [L. S.]

Witnesses:
FRITZ NELSON,
W. PARSONS.